(12) United States Patent
Gershenfeld et al.

(10) Patent No.: US 6,693,540 B2
(45) Date of Patent: Feb. 17, 2004

(54) WIRELESS MONITORING AND IDENTIFICATION USING SPATIALLY INHOMOGENEOUS STRUCTURES

(75) Inventors: Neil Gershenfeld, Somerville, MA (US); Richard Fletcher, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/272,482

(22) Filed: Oct. 16, 2002

(65) Prior Publication Data

US 2003/0102971 A1 Jun. 5, 2003

Related U.S. Application Data

(63) Continuation of application No. 09/617,249, filed on Jul. 14, 2000, now Pat. No. 6,472,987.

(51) Int. Cl.[7] ............................................. G08B 13/14
(52) U.S. Cl. .............................. 340/572.4; 340/572.2; 340/572.6
(58) Field of Search .................. 340/505, 551, 340/572.1, 572.2, 572.4, 572.6, 572.7, 825.44, 5.8, 10.1

(56) References Cited

U.S. PATENT DOCUMENTS

| | | | |
|---|---|---|---|
| 3,596,261 A | 7/1971 | Perneski | 365/1 |
| 3,631,413 A | 12/1971 | Copeland, III | 365/20 |
| 3,680,002 A | 7/1972 | Quine | 331/96 |
| 3,789,374 A | 1/1974 | Sherman | 365/53 |
| 3,811,128 A | 5/1974 | Munson | 343/787 |
| 3,955,159 A | 5/1976 | Mitchell et al. | 333/151 |
| 3,962,652 A | 6/1976 | Zarin et al. | 331/1 R |
| 3,968,481 A | 7/1976 | Grundy et al. | 365/27 |
| 3,971,125 A | 7/1976 | Thies, Jr. | 29/601 |
| 4,074,249 A | 2/1978 | Minasy | 340/572.2 |
| 4,075,618 A | 2/1978 | Montean | 340/572.6 |
| 4,170,013 A | 10/1979 | Black | 343/700 MS |
| 4,236,230 A | 11/1980 | Thompson | 365/157 |
| 4,484,184 A | 11/1984 | Gregor et al. | 340/572.6 |
| 4,510,489 A | 4/1985 | Anderson, III et al. | 340/572.1 |
| 4,940,966 A | 7/1990 | Pettigrew et al. | 340/551 |
| 5,001,458 A | 3/1991 | Tyren et al. | 340/551 |
| 5,029,291 A | 7/1991 | Zhou et al. | 340/551 |
| 5,313,192 A | 5/1994 | Ho et al. | 340/551 |
| 5,334,941 A | 8/1994 | King | 324/637 |
| 5,538,803 A | 7/1996 | Gambino et al. | 428/694 TM |
| 5,554,232 A | 9/1996 | Fujimoto et al. | 148/304 |
| 5,554,974 A | 9/1996 | Brady et al. | 340/572.6 |
| 5,565,849 A | 10/1996 | Ho et al. | 340/572.6 |
| 5,628,840 A | 5/1997 | Hasegawa | 148/304 |
| 5,650,236 A | 7/1997 | Hirano et al. | 428/611 |
| 5,729,201 A | 3/1998 | Jahnes et al. | 340/572.1 |
| 5,821,859 A | 10/1998 | Schrott et al. | 340/572.6 |
| 5,831,532 A | 11/1998 | Gambino et al. | 340/572.1 |
| 5,909,177 A | 6/1999 | Ruhrig | 340/551 |
| 5,926,095 A | 7/1999 | Ho et al. | 340/572.6 |
| 6,011,475 A | 1/2000 | Herzer | 340/572.6 |
| 6,144,300 A | 11/2000 | Dames | 340/572.2 |
| 6,208,253 B1 | 3/2001 | Fletcher et al. | 340/572.1 |
| 6,323,769 B1 | 11/2001 | Dames | 340/572.2 |
| 6,356,197 B1 * | 3/2002 | Patterson et al. | 340/572.1 |
| 6,535,108 B1 * | 3/2003 | Schrott et al. | 340/572.5 |

* cited by examiner

Primary Examiner—Van Trieu
(74) Attorney, Agent, or Firm—Testa, Hurwitz & Thibeault, LLP

(57) ABSTRACT

Tags encode information by means of spatial inhomogeneities that may be detected in the time domain; in effect, characteristics in space are transformed into time for sensing purposes. Such tags may be very inexpensively produced yet carry appreciable quantities of data. The inhomogeneities may be obtained by simple physical modifications to, or externally applied field biases operating on, materials that are very inexpensive to procure.

10 Claims, 7 Drawing Sheets

WIRELESS MONITORING AND IDENTIFICATION USING SPATIALLY INHOMOGENEOUS STRUCTURES

This is a continuation of application Ser. No. 09/617,249, filed on Jul. 14, 2000, now U.S. Pat. No. 6,472,987 the entire disclosure of which is incorporated by reference herein.

FIELD OF THE INVENTION

The present invention relates to remote sensing, tracking, and identification, and in particular to the production and use of inexpensive ID "tags."

BACKGROUND OF THE INVENTION

Various monitoring technologies are known and used to monitor the location of an article or to provide identification in a wide range of contexts.

One such technology, known as "tagging," is commonly employed, for example, in shoplifting security systems, security-badge access systems and automatic sorting of clothes by commercial laundry services. Conventional tagging systems may use some form of radio-frequency identification (RF-ID). In such systems, RF-ID tags and a tag reader (or base station) are separated by a small distance to facilitate near-field electromagnetic coupling therebetween. Far-field radio tag devices are also known and used for tagging objects at larger distances (far-field meaning that the sensing distance is long as compared to the wavelength and size of the antenna involved).

The near-field coupling between the RF-ID tag and the tag reader is used to supply power to the RF-ID tag (so that the RF-ID tag does not require a local power source) and to communicate information to the tag reader via changes in the value of the tag's impedance; in particular, the impedance directly determines the reflected power signal received by the reader. The RF-ID tag incorporates an active switch, packaged as a small electronic chip, for encoding the information in the RF-ID tag and communicating this information via an impedance switching pattern. As a result, the RF-ID tag is not necessarily required to generate any transmitted signal.

Even though RF-ID tags have only a small and simple electronic chip, they are relatively complex devices requiring sophisticated manufacturing techniques to produce. A simpler alternative involves marker elements adapted to affect an interrogation signal in a measurable, characteristic way. Many such systems involve magnetic or magnetomechanical tags. For example, a magnetic wire or strip exhibiting harmonic behavior may be stimulated within an interrogation zone by transmitter antenna coils. The coils generate an alternating magnetic interrogation field, which drives the marker into and out of saturation, thereby disturbing the interrogation field and producing alternating magnetic fields at frequencies that represent harmonics of the interrogation frequency. The harmonics are detected by receiver antenna coils, which may be housed in the same structure as the transmitter coils. Accordingly, the appearance of a tagged article within the zone—which may be defined, for example, near the doors of a retail store or library—is readily detected.

While inexpensive, magnetic antitheft systems tend to encode very little, if any, information. Essentially, the tag merely makes its presence known. While some efforts toward enhancing the information-bearing capacity of magnetic tags have been made—see, e.g., U.S. Pat. Nos. 5,821,859; 4,484,184; and 5,729,201, which disclose tags capable of encoding multiple bits of data—the tags themselves tend to be complex and therefore expensive to produce, and may require special detection arrangements that limit the interrogation range (the '859 patent, for example, requires scanning a pickup over the tag) or involve specialized equipment.

DESCRIPTION OF THE INVENTION

BRIEF SUMMARY OF THE INVENTION

The present invention utilizes tags having spatial inhomogeneities that encode information, and which may be detected in the time domain; in effect, characteristics in space are transformed into time for sensing purposes. Such tags may be very inexpensively produced yet carry appreciable quantities of data. Unlike the prior art, which requires specialized information-bearing structures, the present invention can utilize simple physical modifications to, or externally applied field biases operating on, materials that are very inexpensive to procure.

A first embodiment utilizes an elongated, amorphous, magnetically susceptible element, such as a magnetic wire. Along the length of the element, responsiveness to a time-varying magnetic field is altered in a spatial pattern corresponding to the information to be encoded. The element is then subjected to an interrogating magnetic field, and its response sensed over time to recover the spatially encoded information. It should be stressed that the harmonic tags described earlier can also take the form of magnetic wires that are subjected to interrogation signals. In such traditional systems, however, the signals are sensed in the frequency domain, not the time domain in order to provide a characteristic signature rather than information. The harmonics, in other words, merely facilitate unambiguous detection in an electromagnetically noisy environment.

Alternatively, instead of sensing the response of the element over time, amplitude and phase are detected and the time-domain information recovered from the phase. This is once again in contrast to traditional systems, which neither preserve nor analyze phase information.

In a second embodiment, the element exhibits magnetoelastic behavior, and once again the element is selectively modified either physically or by application of bias fields in accordance with a pattern of information. The element's response to an interrogating magnetic field is sensed over time to recover the encoded information. For example, discrete bias fields applied to the element may define, along the length of the element, a plurality of segments responding differently to the applied field and producing intermodulating response signals. These response signals are sensed and analyzed in the time domain to characterize the bias fields and thereby read the information they encode.

Once again, magnetoelastic markers have previously been used for tagging purposes, but in a manner very different from that described herein. In particular, prior-art surveillance systems utilize only the fundamental mechanical resonance frequency of the marker. A representative marker includes one or more strips of a magnetoelastic material packaged with a magnetically harder ferromagnet (i.e., one with a higher coercivity) that provides a biasing field to establish peak magnetomechanical coupling. The mechanical resonance frequency of the marker is dictated essentially by the length of the strip(s) and the biasing field strength. When subjected to an interrogating signal tuned to this resonant frequency, the marker responds with a large signal field that is detected by a receiver. The size of the signal field is partially attributable to an enhanced magnetric permeability of the marker material at the resonance frequency.

In other prior-art systems, the marker is excited into oscillations by signal pulses, or bursts, generated at the marker's resonance frequency by a transmitter. When an exciting pulse ends, the marker undergoes damped oscillations at its resonance frequency (i.e., the marker "rings down"), and this response (ring down) signal is detected by a receiver. Accordingly, prior systems generally involve a single resonance frequency dictated by the entire tag structure, and a uniform bias field.

In a third embodiment, the element is a higher-frequency element (e.g., a UHF or microwave antenna) that is selectively modified either physically or by application of bias fields in accordance with a pattern of information. The modifications cause modulation to be introduced into the received signal, and the pattern of modulations is indicative of the modifications (and therefore the encoded information).

In a fourth embodiment, magnetic inhomogeneities are established with respect to an otherwise uniform NMR-responsive sample; for example, a magnetic bias strip may be disposed near or against the sample. The pattern of magnetic biases results in an NMR spectrum with multiple peaks corresponding to the bias pattern.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. Magnetic Hysteretic Embodiment

Figure 1:
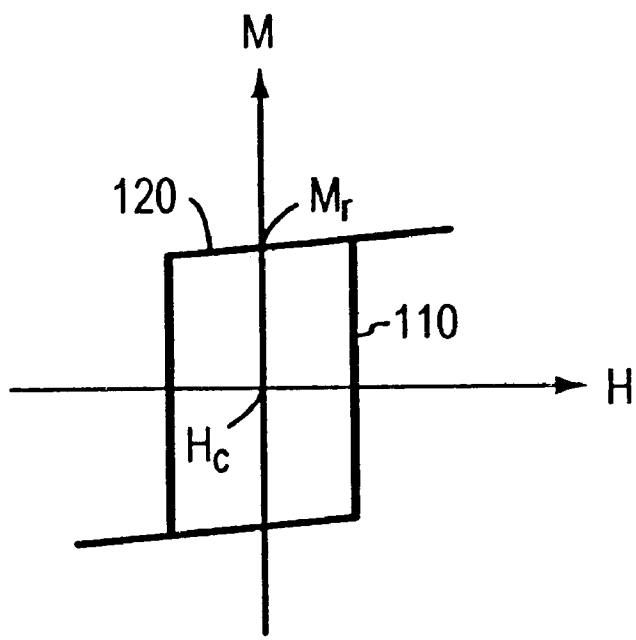
FIG. 1 shows a hysteresis loop illustrating the performance of a magnetic material in accordance with the present invention.

The first embodiment of the invention utilizes elongated, amorphous, magnetically susceptible elements, preferably those that magnetize by lengthwise propagation of a domain wall. These terms are best understood with reference to FIG. 1, which illustrates the performance of a magnetic material in terms of an M-H graph showing the material's magnetic response to a changing applied field. The "magnetic susceptibility" of a material refers to the size of an applied magnetic field H necessary to induce a given degree of magnetization M in the material. In a demagnetized material, increasing the applied field H increases the magnetic induction M of the material along the magnetization line 110. Thus, the induction increases quickly as the field H rises above zero; the more susceptible the material, the more quickly the line 110 will begin to rise. When the external field is decreased, however, the magnetic induction retreats relatively slowly along the demagnetization line 120. This hysteresis reflects the tendency of a ferromagnetic material to retain an induced magnetization. Thus, when the applied field strength is reduced to zero, the material still retains a "remanent magnetization" $M_r$. A reverse magnetic field must be applied to return M to zero in a ferromagnetic material; the strength of that field, $H_c$, is termed the "intrinsic coercivity" of the material. Substantially square hysteresis loops, such as that shown in FIG. 1, are preferred for the present invention for the reasons discussed below. These occur due when the magnetizable material exhibits magnetic anisotropy—i.e., the tendency for magnetization to lie along particular axes. This results in relatively sharp transitions along the hysterisis loop, since magnetization tends to flip rather than assume intermediate directions.

An amorphous material contains no widespread crystalline structure or long-range order. As a consequence, local changes in magnetization tend to remain confined to the affected region without propagation; moreover, bulk structural properties do not overwhelm properties intrinsic to the material itself.

An elongated, amorphous, magnetically susceptible element useful in the practice of the present invention may take the form of a wire (as set forth, for example, in U.S. Pat. No. 5,554,232, the entire disclosure of which is hereby incorporated by reference). Such a wire will have a natural magnetic orientation along its entire length. If the wire is thin—i.e., if the cross-sectional diameter is small than the width of a magnetic domain—exposure of the material to a magnetic field of sufficient strength results in magnetization propagating as a domain wall along the length of the wire from one end to the other, flipping or reinforcing the wire's natural magnetic orientation. (A magnetic interrogation field ordinarily has some degree of non-uniformity, so that magnetization propagates along the wire in a single direction as dictated by the field divergence.)

Figure 2A:
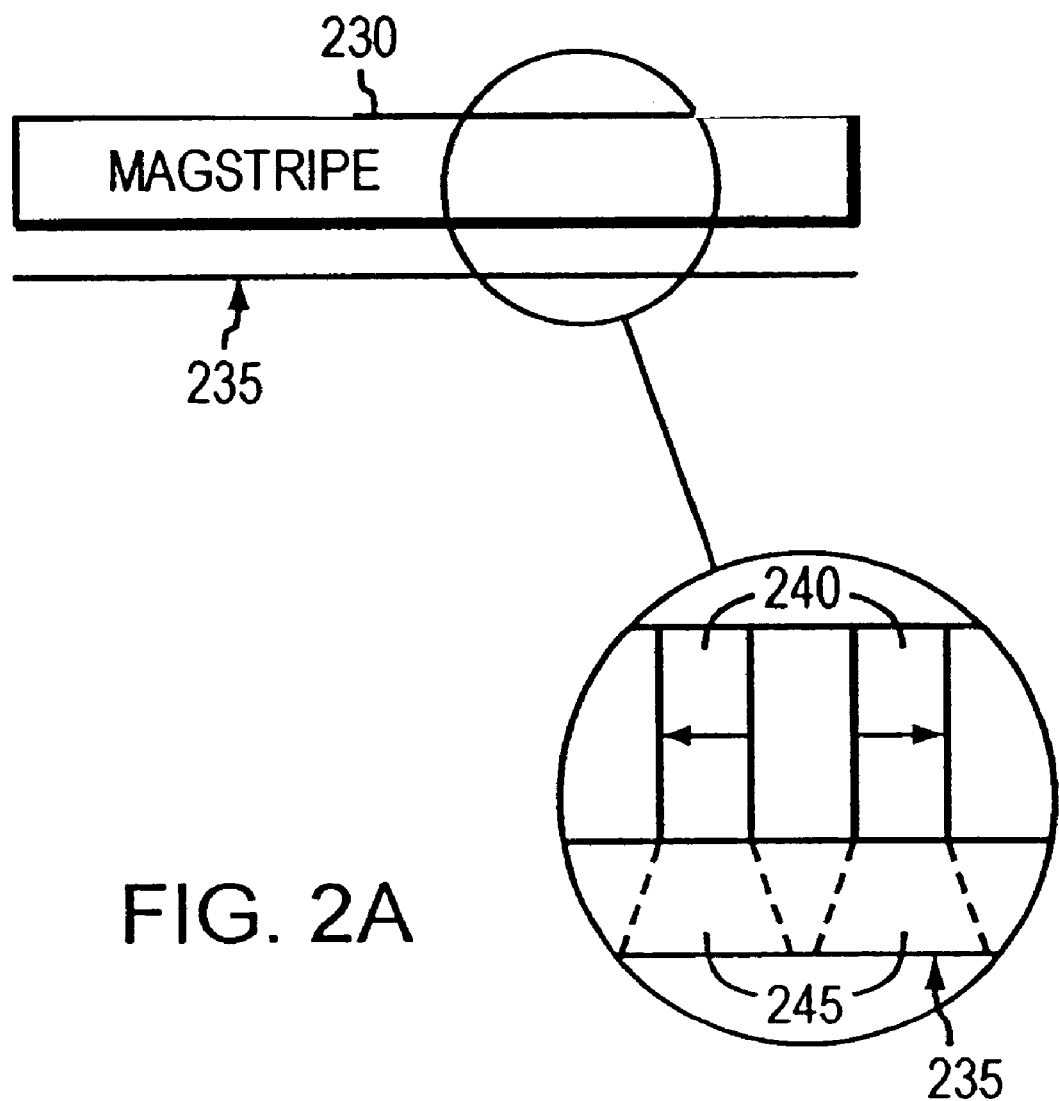
FIG. 2A is a plan view with an enlarged region showing operation of the invention using a magnetic hysteretic element acted upon by external magnetic bias fields from a conventional magstripe.
Figure 2B:
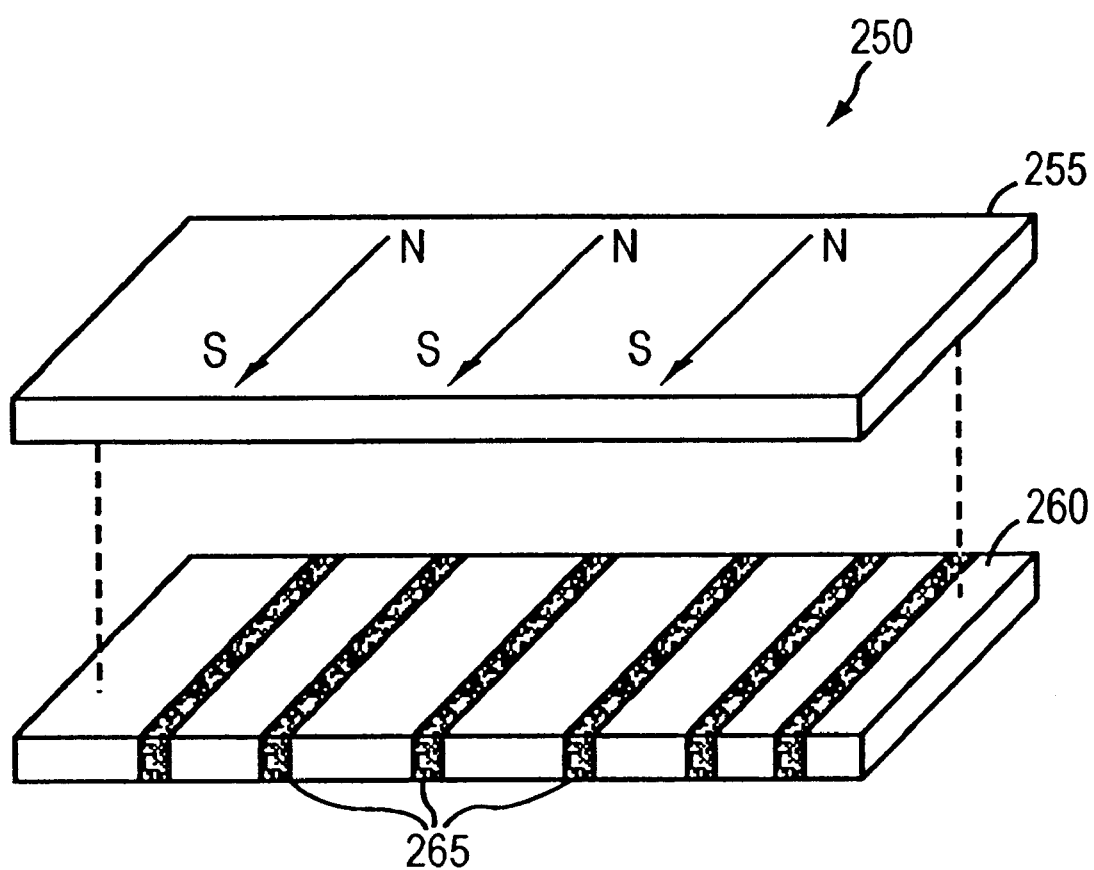
FIG. 2B is an isometric view of an alternative source of magnetic bias fields.

In accordance with the invention, the element may be biased so that the net magnetizing force varies over the length of the material in a pattern representative of information; or the element may instead be physically modified so that its magnetic susceptibility varies over its length. FIGS. 2A and 2B illustrate the first of these approaches. With reference to FIG. 2A, magnetic stripe ("magstripe") 230, permanently encoded with magnetic information, is placed in sufficient proximity to a magnetic wire 235 for the fields from magstripe 230 to exert a measurable effect thereon. Magstripe 230 contains a series of zones, representatively indicated at 240, biased in one or the other direction relative to wire 235. The bias fields 245 created by zones 240 either retard or enhance magnetic induction in wire 235 within the spatial regions over which the zones have an effect. In other words, since magnetization occurs in accordance with the wire's intrinsic hysteresis loop, bias fields 245 will either complement the applied field (so magnetization within the region affected by the field occurs more quickly than in unaffected regions) or oppose it (so magnetization occurs less quickly). As a result, the rate of propagation of the domain wall through wire 235 will vary, with the pattern of variation dictated by the pattern of bias fields 245. Following the progress of magnetization over time, therefore, indicates the distribution of bias fields 245 over the length of wire 235.

An alternative to a magstripe bias strip is shown in FIG. 2B. In this case, the structure 250 comprises a strip 255 of a uniformly magnetized material in contact with a support 260 of generally equivalent dimensions. The bulk of support 260 has a first magnetic permeability, while a series of selectively placed regions 265 have a second permeability. As a result, the magnetic field experienced by a wire located below support 260 will vary with position. For example, support 260 may be a highly permeable material with regions 265 representing air gaps, resulting in lower permeability. More typically, regions 265 will have a higher permeability than the bulk support 260 so that the structure 250 behaves in the manner of a magstripe. For example, support 260 may be plastic and regions 265 embedded strips of iron or magnetically permeable ink compatible with a printed manufacturing process.

Figure 3:
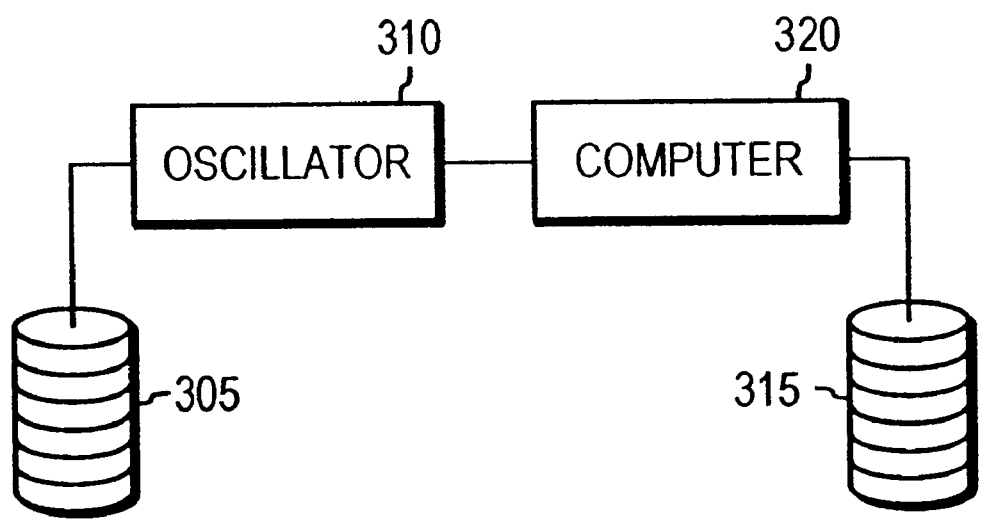
FIG. 3 is a detector circuit suitable to operate the embodiment illustrated in FIG. 2.

A suitable detector circuit for this purpose is shown in FIG. 3. The circuit includes an energizing or excitation coil 305; an oscillator 310, which provides AC signals that create the excitation field; a detection coil 315; and a computer 320 that controls oscillator 310 and interprets the signals sensed by detection coil 315. As long as the magnetic field produced by coil 305 is sufficiently strong, the orientation of wire 100 with respect to the field will be unimportant; the effective field strength is represented by the dot product of the field vector H with the direction of the wire. In general, effective field strengths as small as 1 gauss are sufficient to magnetize a thin wire 235; excitation frequencies are generally below 1 MHz, and typically range from as few as 5 Hz to 10 kHz. A square hysteresis loop results in discrete magnetization "jumps" that are discrete and therefore more easily detected as a series of bits.

It should also be noted that magstripe 230 may be the conventional type of strip applied to credit cards or the like, or may be a strip of stronger magnetic material (or a series of discrete magnets) to provide greater field strength, or some combination thereof. As used herein, the term "magstripe" is intended to connote any of these approaches, and the term "magnetic bias strip" is intended to embrace magstripes and other structures exerting similar effects, such as the structure 250 shown in FIG. 2B.

Figure 4:
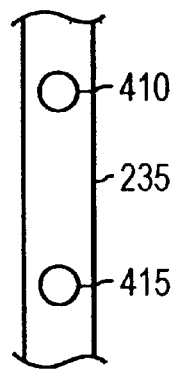
FIG. 4 is an enlarged depiction of a magnetic hysteretic element that has been physically modified to achieve spatial inhomogeneities.

In the second approach to practice of this embodiment, discrete physical modifications are introduced along the length of wire 235. These modifications selectively retard or enhance magnetic induction in the regions over which they extend. FIG. 4 shows a pair of representative modifications 410, 415 in wire 235. These may be, for example, holes through or indentations in wire 235 (produced, for example, by chemical etching or laser cutting), which act as domain wall barriers or produce damping; or nucleation sites or magnetization points (applied, for example, by spot welding) that enhance magnetic susceptibility or permeability.

2. Magnetoelastic Embodiment

Figure 5A:
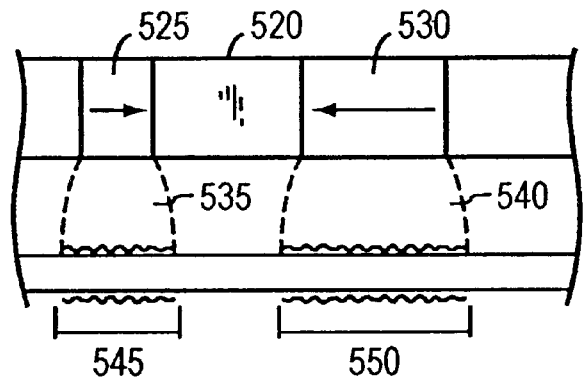
FIG. 5A is an enlarged depiction of a magnetoelastic element acted upon by external magnetic bias fields.
Figure 5B:
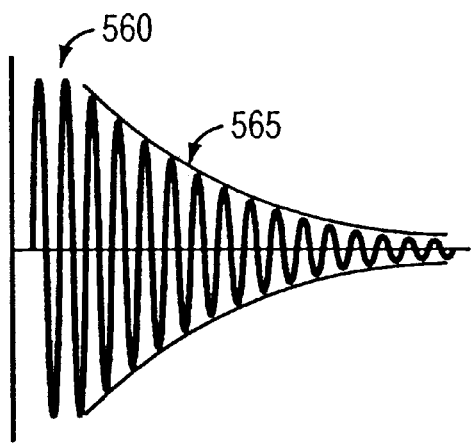
FIGS. 5B and 5C illustrate, respectively, the ring down of isolated and interacting magnetoelastic resonance elements.
Figure 5C:
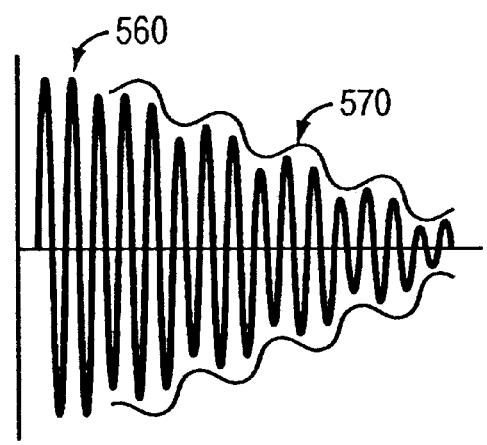

In the second embodiment of the invention, an illustrative fragment of which appears in FIG. 5A, an elongated, amorphous, magnetoelastic element 510 is positioned proximate to a magnetic bias strip 520. Once again, element 510 may be a magnetic wire as described above. Magnetic bias strip 520 contains a series of zones, representatively indicated at 525, 530, of different widths. Each zone 525, 530 creates a distinct bias field 535, 540, and because element 510 is amorphous, the effects of bias fields 535, 540 are largely confined to the opposed regions 545, 550 of element 510. Each region 545, 550 behaves essentially as a separate resonance element with its own resonant frequency. During the ring-down phase following an excitation signal, e.g., from excitation coil 305 of the detector circuit shown in FIG. 3, the signals from the various biased regions interact and modulate one another. Observing the modulations in the time domain facilitates extraction of the pattern of biased regions. This is illustrated in FIGS. 5B and 5C. FIG. 5B shows the ring-down phase of a single (unbiased) resonance element, in which the oscillations 560 decay within a smooth envelope 565. In FIG. 5C, the interactions or "beating" among the oscillations 560 from different resonance elements (corresponding to biased and unbiased regions of the element 510) produce a patterned envelope 570, which encodes the pattern of the bias zones.

Alternatively, the differently responsive regions 545, 550 can be formed by physical modification rather than by field biasing. For example, mechanically separate regions can be defined along element 510 by crimping, cutting, effectively resulting in individual resonators whose response signals interact as described above.

3. Microstripline Embodiment

With reference to FIG. 6, a microstrip line antenna 600 includes a groundplane electrode 610, a dielectric spacer 615, and a microstrip element 620. In ordinary usage, antenna 600 acts as a waveguide, receiving broadcast signals in the microwave or UHF range of the electromagnetic spectrum for amplification and use. In accordance with the present invention, discontinuities are introduced along the length of microstrip element 620. When antenna 600 is excited in its resonant mode by an appropriate electromagnetic signal, the discontinuities are coupled into the antenna's response, affecting its impedance and causing energy to leak out of the structure at the points of discontinuity.

As a result, the detected signal will contain modulations not present in the excitation signal, and these modulations are used to reconstruct the pattern of discontinuities. The discontinuities may be caused by magnetic bias fields, by additional waveguide elements, or by a series of physical modifications 630. In one approach, illustrated in FIG. 6B, a series of microwave resonators or harmonic strips 632 are mounted adjacent microstrip element 620; these alter the effective impedance of element 620 along the zones of adjacency.

Figure 6A:
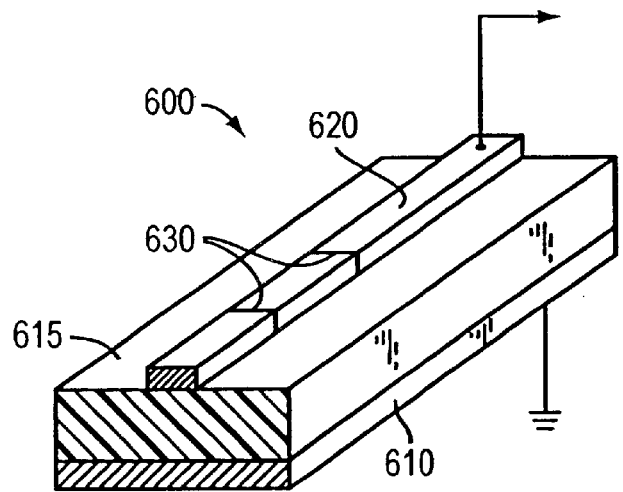
FIG. 6A is an isometric view of a segment of a microstrip antenna useful in accordance with the present invention.
Figure 6G:
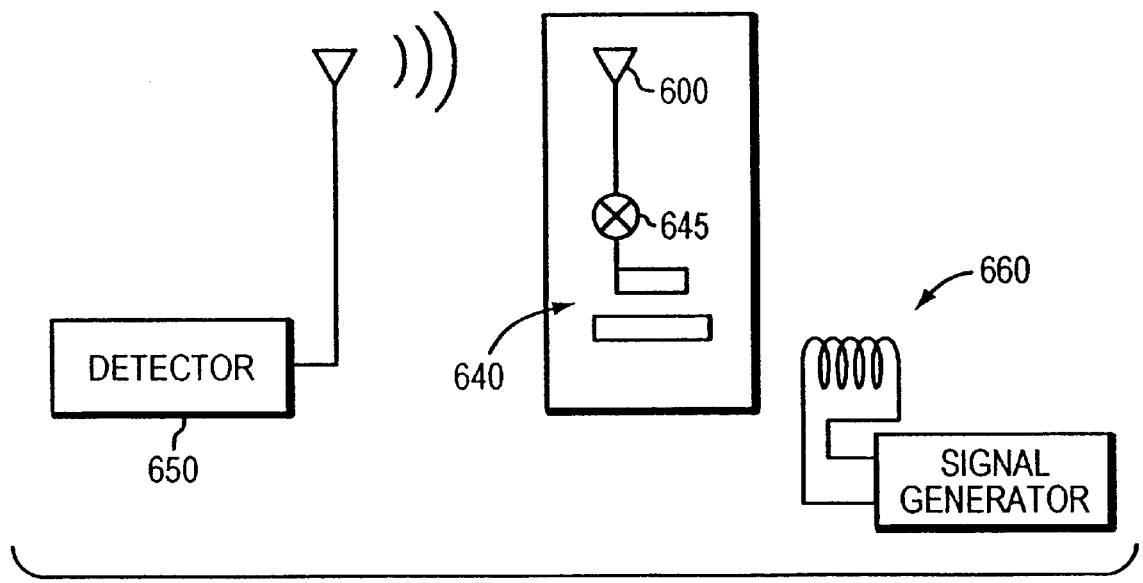
FIG. 6G is a block diagram of an arrangement for downconverting the operation of a microwave-resonant tag to a lower frequency for purposes of detection.
Figure 6B:
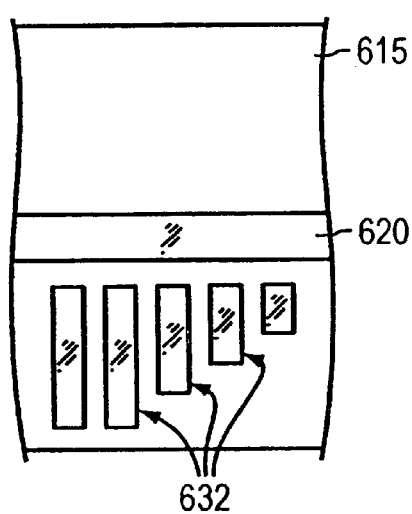
FIG. 6B is a plan view of a segment of a microstrip antenna with resonators or harmonic strips adjacent to the microstrip element.
Figure 6C:
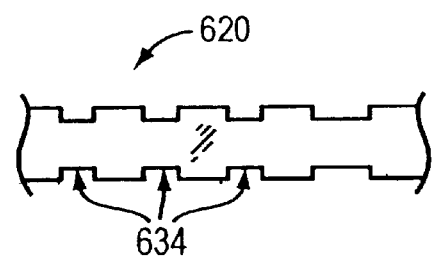
FIG. 6C is a plan view of a microstrip element having physical discontinuities that cause variations in impedance.

In FIG. 6C, physical modifications—such as a series of notches 634—are used to alter the impedance of element 620. Since the impedance of element 620 is determined, inter alia, by its width, notches 634 increase impedance locally where they occur.

Figure 6D:
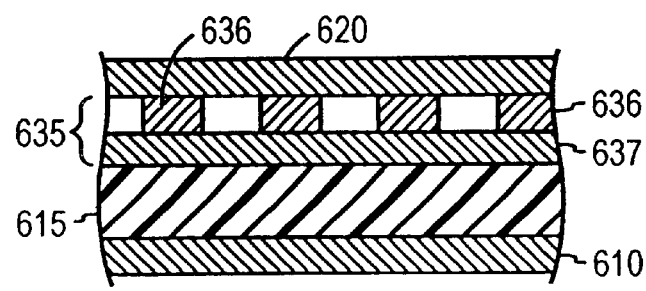
FIG. 6D is a sectional view of a microstrip antenna in which magnetic bias is used to vary impedance.

The impedance of microstrip element 620 can also be altered locally by selectively applied magnetic fields. As shown in FIG. 6D, a magnetic bias element 635 (similar in concept to the structure 250 shown in FIG. 2B) can underlie element 620. Element 635 includes a uniformly magnetized layer 637 disposed on dielectric spacer 615, and a series of magnetically permeable segments 636 upon which microstrip element 620 rests. The magnetic field experienced by element 620 will be more intense where the element is in contact with segments 636, since these elements are more permeable than air (which otherwise intervenes between magnetized layer 637 and element 620). The magnetic field varies impedance along microstrip element 620 in the manner of the physical discontinuities shown in FIG. 6C.

Figure 6E:
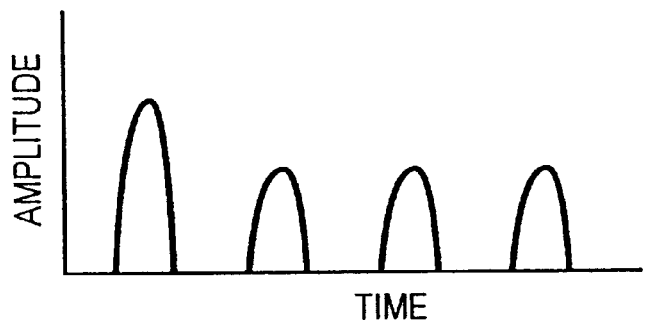
FIG. 6E shows the time-domain effect of selective, local impedance variations on the output signal.
Figure 6F:
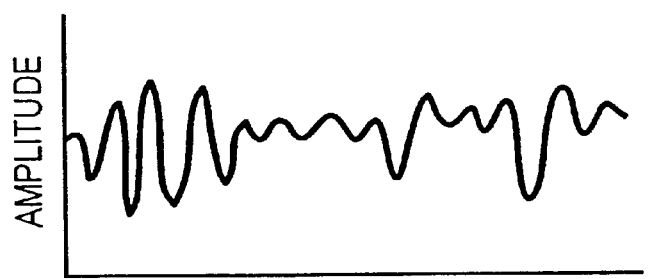
FIG. 6F shows the phase effect of selective, local impedance variations on the output signal.

The effect of any of these modifications on the output signal is shown in FIGS. 6E and 6F. FIG. 6E, which plots output amplitude as a function of time, shows a series of peaks that result from the impedance mismatches along element 620. FIG. 6F illustrates the effect on the phase of the output signal; the signal amplitude will vary with phase as determined by the pattern of impedance mismatches. Thus, the pattern of those discontinuities generates a unique effect on the output signal which can be observed in the time domain or as a function of phase, facilitating recovery of the pattern.

In the frequency domain, the consequences of modulation typically extend through numerous harmonics into very high frequency levels. This results in a large affected bandwidth, which may pose difficulties in terms of signal radiation from the antenna. To avoid this effect, the approach shown in FIG. 6G may be adopted, whereby antenna 600 is coupled into a secondary response element 640 by means of a mixer 645. Secondary element 640 has a lower-frequency response characteristic, and as a result, the modulations of interest are downconverted to this lower frequency band for sensing by a detector 650.

For example, secondary element 640 may be the amorphous, magnetically susceptible element described above in connection with the hysteretic embodiment. In this case, mixer 645 may be a nonlinear mixing component, such as a diode, which receives the output of antenna 600. The output of mixer 645 is then converted to a magnetic signal (via a coil), which is coupled into the magnetically susceptible element 640. Element 640 is driven as described previously (e.g., using, as the detector 650, the circuit illustrated in FIG. 3). As a result of this arrangement, mixer 645 multiplies the output of antenna 600 with the driving signal from a local excitation coil 660. Consequently, the signals produced by the local magnetic phenomena in element 640 will produce detectable modulations in the higher-frequency signal coupled by antenna 600. Alternatively, if the power of the high-frequency signal is sufficient, then adequate power will be available after the mixer stage in order to excite the magnetic element without the need for the additional local excitation coil.

4. NMR Embodiment

In a time-invariant applied magnetic field $B_{DC}=B_0 z$ along the z axis, a nucleus of spin I has 2I+1 possible quantum spin states at equally spaced corresponding energy levels, any pair of levels being separated by $$\Delta E = \frac{\mu B_0}{I}$$

corresponding to the resonant frequency $$W = \frac{\Delta E}{h}.$$

The magnetic moment of the nucleus $$\mu = \frac{\gamma h I}{2\pi}$$

includes the magnetogyric moment γ, which is a constant for a given nucleus. A nucleus of spin $$I = \frac{1}{2}$$

may thus be in either of two spin states, i.e., having its magnetic moment component aligned with or against the applied magnetic field.

An rf electromagnetic field of frequency ω and phase Φ applied in a direction perpendicular to the static field (e.g., along the x direction) introduces a magnetic field of magnitude $B_1$ that can be viewed as a single field rotating about the z axis at ω. In a frame of reference rotating with this magnetic field, the spin experiences an effective magnetic field having the components ($B_1$ cos Φ)x, ($B_1$ sin Φ)y, and $$\left(B_0 - \frac{\omega}{\gamma}\right)z.$$

Thus, the spins absorb energy most strongly at the resonant frequency W. Because that frequency is a function of ΔE, which itself depends on the applied static field $B_0$, the application of magnetic biases along the length of an NMR-responsive sample will alter the local resonant frequency of the sample by augmenting or reducing the static field $B_0$.

Figure 7:
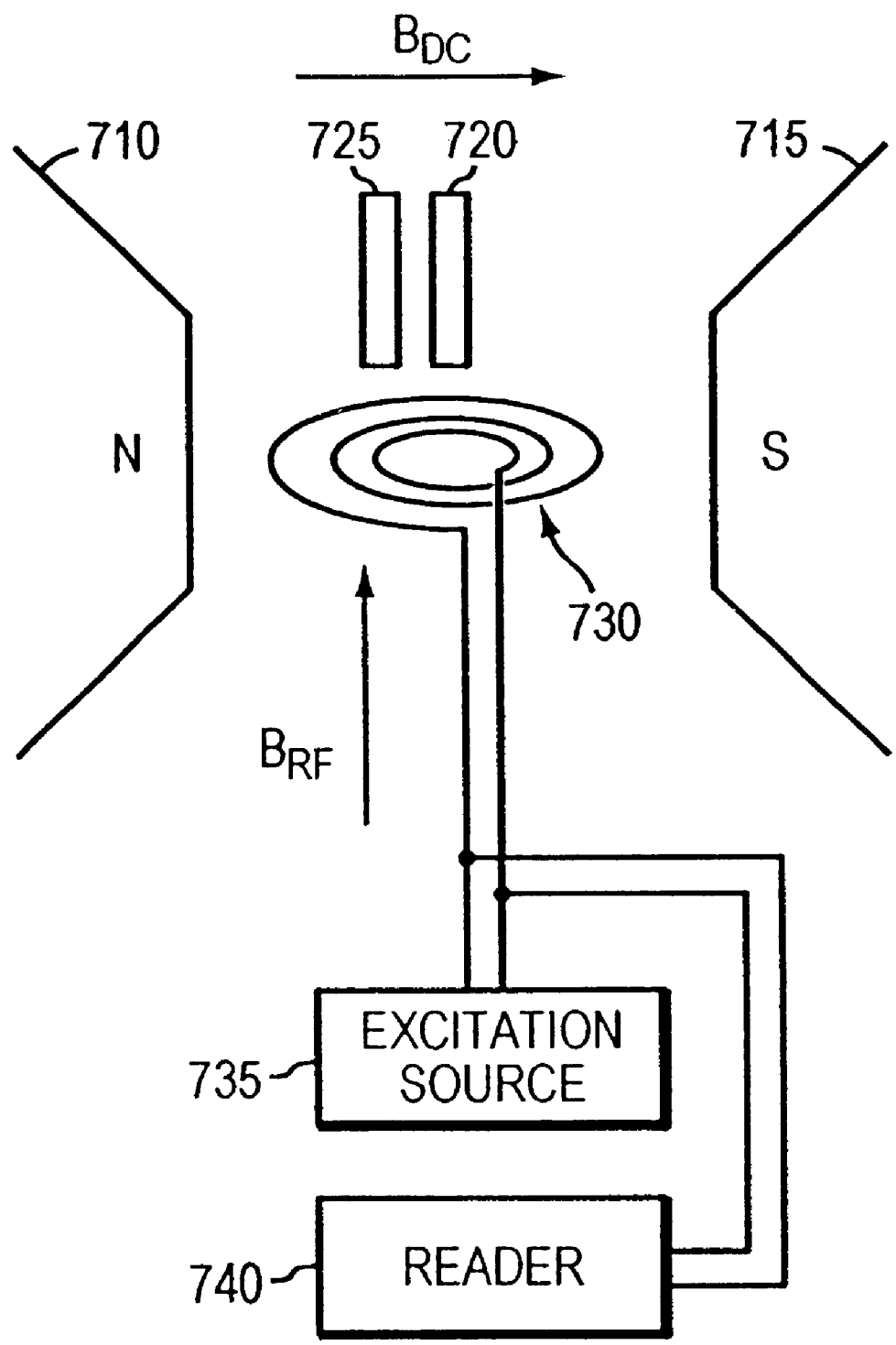
FIG. 7 schematically illustrates a detector circuit for the NMR embodiment of the invention.

This may be exploited as illustrated in FIG. 7. A pair of magnets 710, 715 produce a static magnetic field $B_{DC}$. A uniform, NMR-responsive sample 720 is positioned within the field $B_{DC}$, and a magnetic bias strip 725 is disposed near or against sample 720; the sample 720 and bias strip 725 together form a tag in accordance with the present invention. A coil 730 encircles or, as shown, may be located beneath sample 720 and bias strip 725. A source 735 of rf electromagnetic excitation energizes coil 730, resulting in a time-varying magnetic field $B_{RF}$ whose direction is perpendicular to that of $B_{DC}$. A reader 740 detects the energy absorbed by sample 720. Without bias strip 725, a single dominant peak (corresponding to the resonant frequency W of sample 720) would be observed as source 735 sweeps through a range of frequencies. However, because of the pattern of alternating magnetic biases imposed by strip 725, the NMR spectrum reveals multiple peaks whose pattern corresponds to the bias pattern. Although this pattern is observable in the frequency domain, better signal-to-noise ratios are obtained if the excitation is carried out through a sequence of rf pulses and then the frequency response of the tag is detected as a function of time, using so-called "spin-echo" techniques.

It will therefore be seen that the foregoing represents an inexpensive and versatile approach to encoding information for external sensing. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of sensing information, the method comprising the steps of:
   a. providing a magnetically responsive, amorphous, magnetoelastic element having a length;
   b. varying, along the length of the element, the responsiveness of the element to an applied time-varying magnetic field in a spatial pattern corresponding to the information, such that a propagation rate of a magnetic response along the length will vary in accordance with the spatial pattern;
   c. subjecting the element to an applied time-varying magnetic field to induce the magnetic response therein; and
   d. sensing changes in the response propagation rate to recover the spatially encoded information by removing the field and receiving a response signal from the element to recover the spatially encoded information.

2. The method of claim 1 wherein the element has a length and responsiveness is varied by applying, along the length of the element, discrete bias fields to the element.

3. The method of claim 2 wherein the bias fields define, along the length of the element, a plurality of segments responding differently to the applied field and producing intermodulating response signals, the sensing step comprising identifying the response signals to characterize the bias fields.

4. The method of claim 1 wherein the responsiveness is varied by introducing discrete physical modifications along the length of the element.

5. The method of claim 4 wherein the modifications define, along the length of the element, a plurality of segments responding differently to the applied field and producing intermodulating response signals, the sensing step comprising identifying the response signals to characterize the modifications.

6. A system for encoding and sensing information, the system comprising:
   a. a field-responsive, elongated, amorphous, magnetoelastic element having a length along which is varied the responsiveness of the element to an applied time-varying magnetic field, the variation conforming to a spatial pattern corresponding to the information, such that a propagation rate of a magnetic response along the length will vary in accordance with the spatial pattern; and
   b. means for sensing a time-dependent response of the element to an applied time-varying magnetic field to recover the spatially encoded information by removing the field and receiving a response signal from the element.

7. The system of claim 6 further comprising means for applying a series of bias fields applied along the length of the element.

8. The system of claim 7 wherein the bias fields define, along the length of the element, a plurality of segments responding differently to the applied field and producing intermodulating response signals, the sensing means identifying the response signals to characterize the bias fields.

9. The system of claim 6 wherein the element comprises discrete physical modifications along the length thereof.

10. The system of claim 9 wherein the modifications define, along the length of the element, a plurality of segments responding differently to the applied field and producing intermodulating response signals, the sensing means identifying the response signals to characterize the modifications.

* * * * *